June 19, 1962 W. UHRIG 3,039,408
APPARATUS FOR MAKING SLIDE FASTENER CHAIN
Filed Nov. 22, 1960 5 Sheets-Sheet 1

INVENTOR:
WILHELM UHRIG
By Kurt Kelman
His Agent

INVENTOR:
WILHELM UHRIG

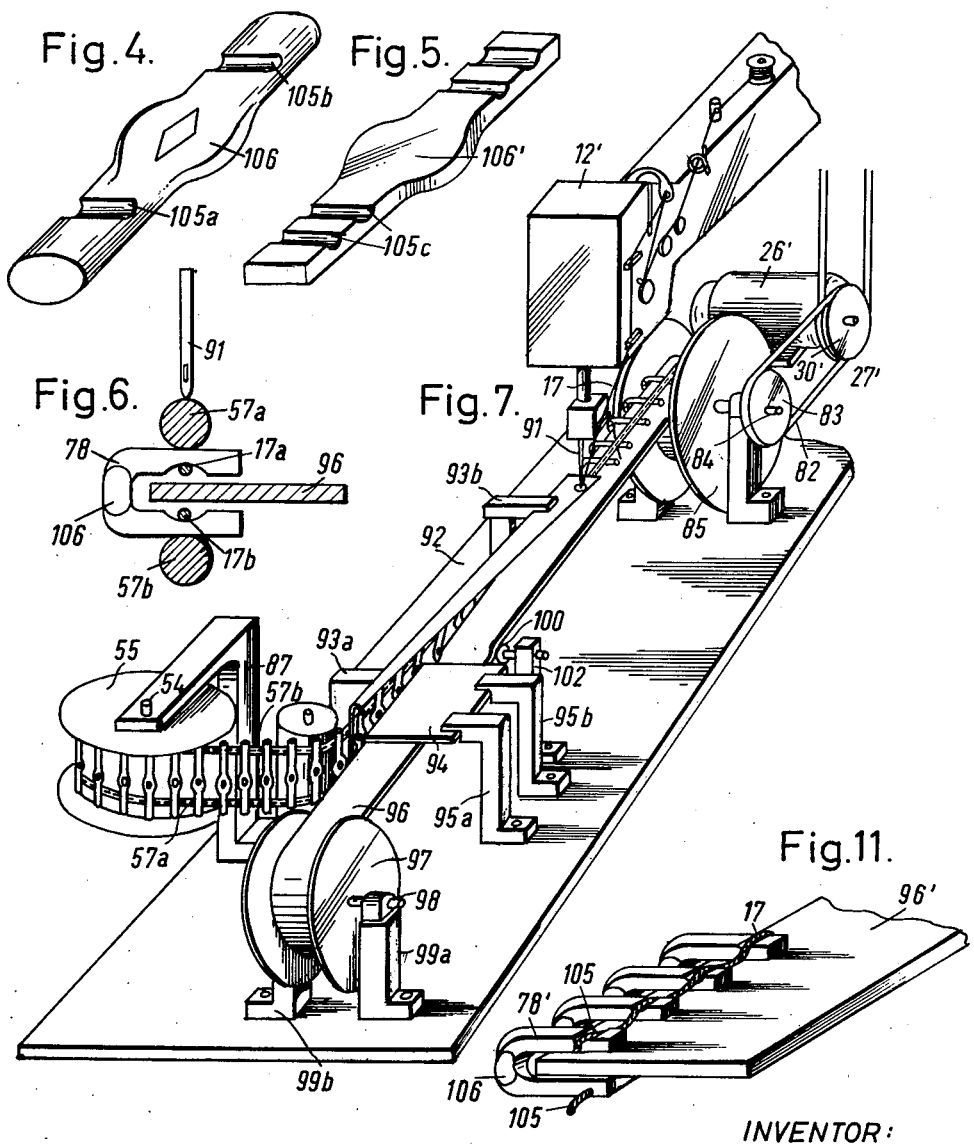

INVENTOR:
WILHELM UHRIG

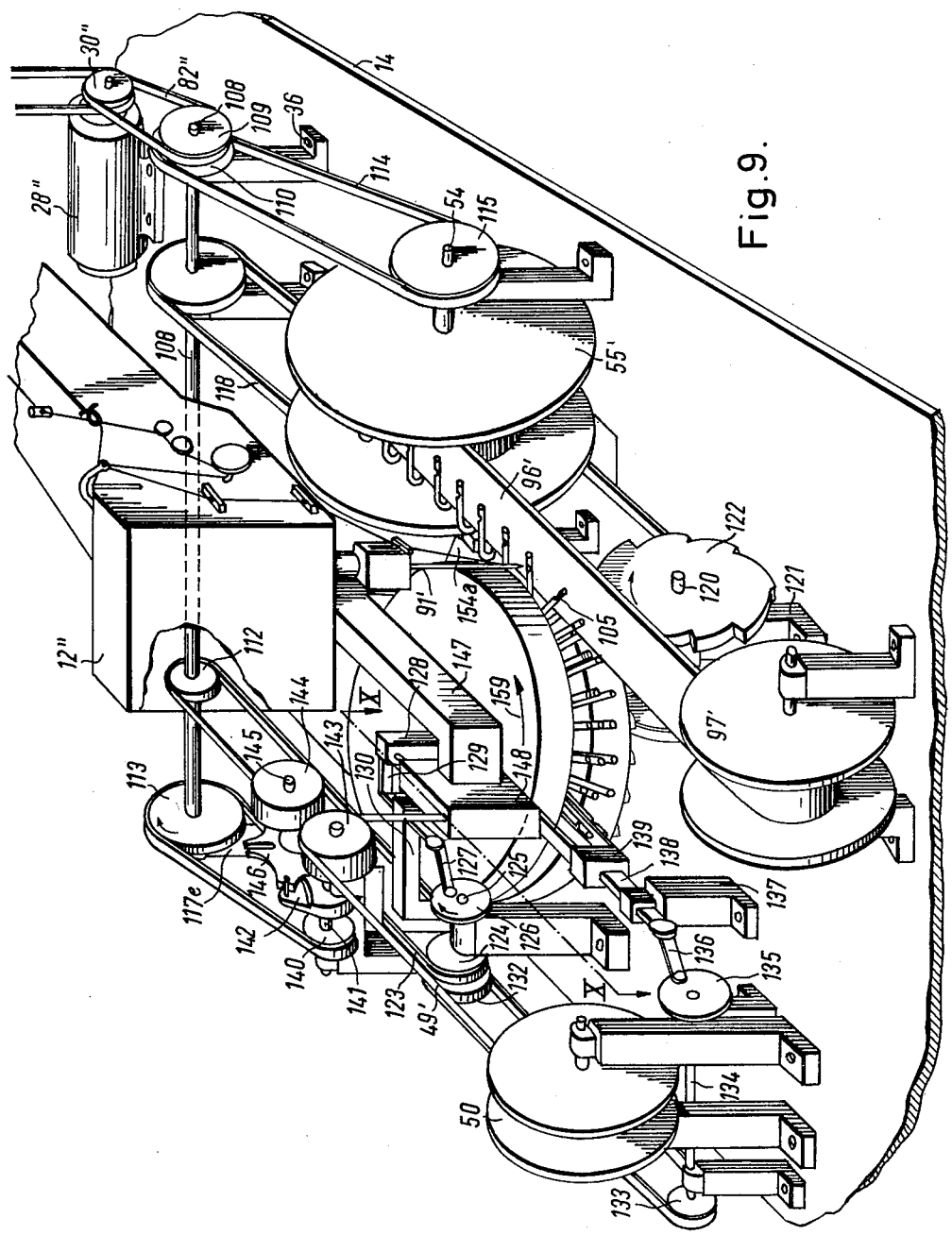

United States Patent Office 3,039,408
Patented June 19, 1962

3,039,408
APPARATUS FOR MAKING SLIDE FASTENER CHAIN
Wilhelm Uhrig, Wuppertal-Elberfeld, Germany, assignor to Patentgesellschaft Plate & Co., Altdorf, Switzerland, a corporation of Switzerland
Filed Nov. 22, 1960, Ser. No. 70,954
Claims priority, application Germany Nov. 24, 1959
7 Claims. (Cl. 112—2)

This invention relates to apparatus for making slide fastener chain, and more particularly slide fastener chain essentially consisting of a continuous length of a flexible support member having individual interlockable fastener elements mounted thereon in spaced relationship. In its more specific aspects, the invention is concerned with slide fastener chain the interlocking elements of which are made from synthetic plastic material.

Two basic methods have been employed heretofore for producing such chain. According to one known method, individual interlocking elements are cast or molded from thermoplastic material directly on the tape or other flexible support member, as by injection molding. This method has the advantages of providing accurate spacing of individual elements and makes relatively effective use of the plastic material. Because of the necessarily high temperature employed in shaping the elements, the best mechanical properties of the plastic which can be achieved by cold working, such as stretching, are not available to molded elements.

The other known method uses plastic filaments as the raw material for the elements. The filaments which may have the shape of round, flattened or otherwise deformed wires may be prestretched to develop the best mechanical properties of the material. They are then shaped into continuous elongated structures, such as spirals, which are sewn to a flexible support member. It is inherently difficult to sew a relatively complex, easily deformed body such as a spiral in precisely spaced relationship of its consecutive portions, such as the turns of the spiral. The material also is not fully utilized. Not all portions of the preshaped wire actually perform a useful function. A portion of the material merely serves for connecting successive elements, a function not useful for the finished product.

It is an important object of this invention to combine in a slide fastener chain manufacturing process the advantages of the two afore-mentioned known methods without their disadvantages.

Another object is the provision of apparatus for making slide fastener chain from filamentous material which is formed into individual interlocking elements that are secured to a flexible supporting member.

In its more specific aspects, the invention aims at providing apparatus for shaping pre-stretched plastic filaments, cutting individual portions from the shaped filament and sewing them to a flexible support which may be a tape, cord, or the like.

With these and other objects in view, the invention provides a sewing machine and a feeding device for feeding a continuous length of plastic filament toward the work station of the sewing machine along a predetermined path. A die is transversely moved toward and away from the path for shaping the filament. Cut-off means are interposed on the filament path between the die and the work station of the sewing machine for severing consecutive forward portions of the shaped filament from the continuous length thereof. Another feeding device feeds a flexible support in continuous length to the work station of the sewing machine in a direction transverse of the filament path so that the consecutive forward portions of the filament may be sewn sequentially to the flexible support at the station. The feeding devices, the die, the cut-off means and the sewing machine are moved synchronously.

Other features and many of the attendant advantages of this invention will be readily appreciated as the same becomes better understood by reference to the following detailed description of preferred embodiments thereof when considered in connection with the accompanying drawings in which like reference numerals designate like or corresponding parts throughout the figures thereof, and wherein:

FIG. 4 illustrates a plastic interlocking element produced on the apparatus of FIG. 1, the element being seen in perspective view on an enlarged scale;

FIG. 5 shows a modified plastic element in a view corresponding to that of FIG. 4;

FIG. 6 shows interlocking elements assembled on the apparatus of FIG. 1 in the process of being attached to a carrier tape, the view being in cross section;

FIG. 7 shows the apparatus for mounting the elements assembled on cords by the apparatus of FIG. 1 on carrier tape, the view corresponding to that of FIG. 1;

FIG. 9 illustrates another embodiment of the invention which exemplifies apparatus for mounting plastic interlocking elements on a supporting tape, the view being in perspective;

FIG. 11 shows the fastener chain produced on the apparatus of FIG. 9 in a perspective view.

The embodiments of the apparatus of the invention chosen for the purpose of illustration are attachments for conventional sewing machines. These sewing machines which form integral elements of the apparatus of the invention will be shown and described only to the extent necessary for an understanding of the invention and those skilled in the art will appreciate that they include all those elements commonly found in sewing machines though not specifically illustrated and described.

Figure 1:
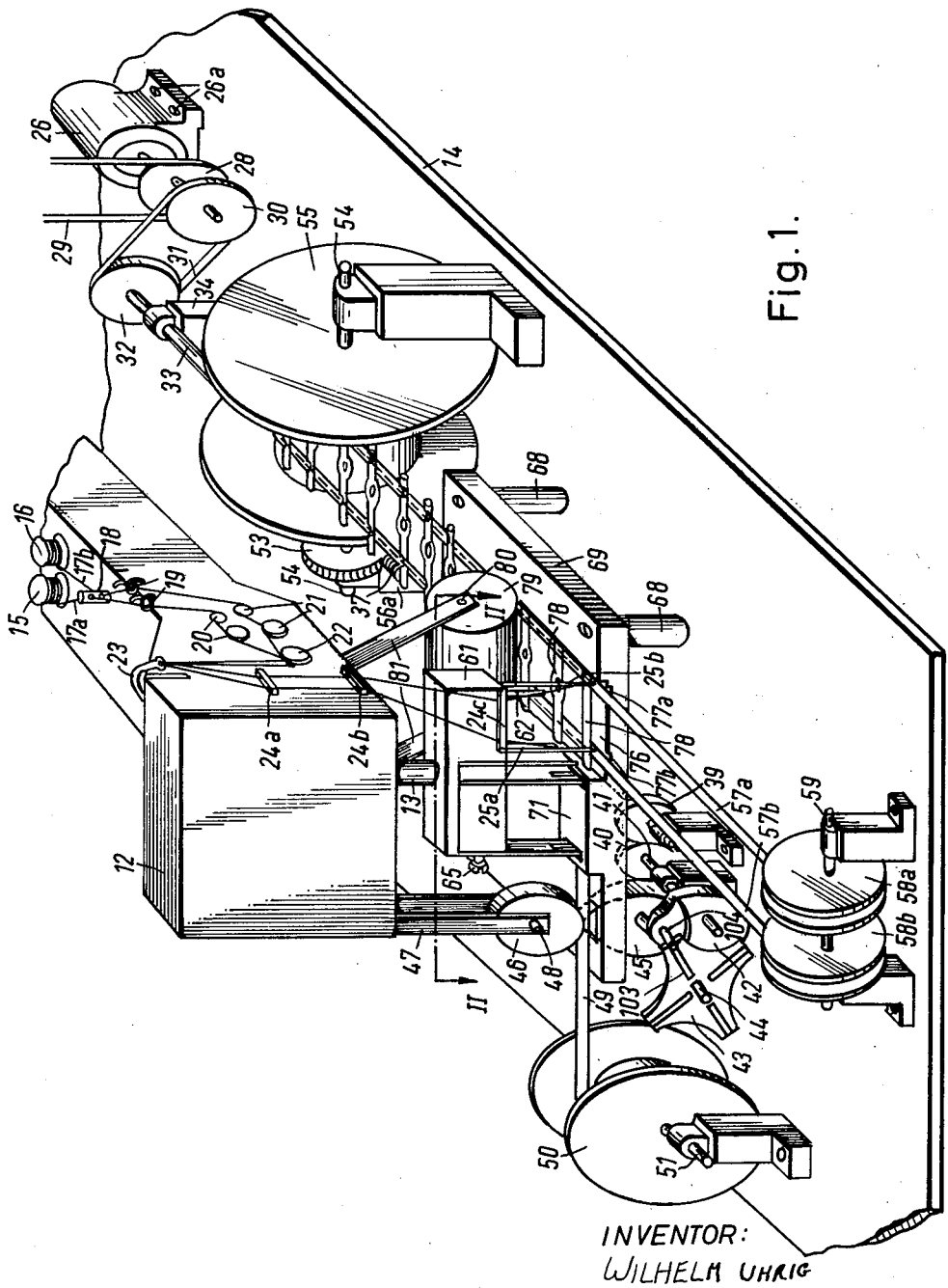
FIG. 1 is a perspective view of a preferred embodiment of the invention for assembling interlocking elements with cords.

Referring now to the drawing in detail, and initially to FIG. 1, there is seen the arm 12 of a sewing machine mounted on a worktable 14 (in a manner not shown) for actuating reciprocating movement of a needle bar 13. The sewing machine arm 12 carries two spools 15, 16 from which upper threads 17a and 17b are drawn over thread guides 18, 19 and guide pulleys 20, 21 to tension discs 22. They then pass over a thread take-up lever 23 and additional thread guides 24a, 24b and 24c to two needles 25a and 25b which are mounted on the common needle bar 13 and are spaced from each other transversely of the direction of elongation of the arm 12.

The mechanism providing underthreads to the work station of the sewing machine in the area in which points of the needles 25a, 25b reciprocate has not been illustrated since it is not in itself essential to an understanding of the invention. It will be understood that the sewing machine comprises the usual stitch forming elements which cooperate with the needles 25a, 25b to form two rows of stitches.

The sewing machine is driven by an electric motor 26 which is secured to the work table 14 by bolts 26a. The output shaft 27 of the motor 26 carries a drive pulley 28 from which movement is transmitted to the sewing machine mechanism in the arm 12 in the usual manner by a belt 29. A second drive pulley 30 on the motor shaft 27 drives a countershaft 33 by means of a belt 31 which is trained over the drive pulley 30 and a pulley 32 fixedly fastened on the counter shaft 35. The counter shaft is journaled in two pillow blocks 34 and 35 best seen in FIG. 3. The pillow blocks are fastened to the work table 14 by means of bolts 36. The axis of the shaft 33 is horizontal, parallel to the work table 14 and spaced therefrom in an upward direction.

The several shafts described hereinafter will be understood to have horizontal axes parallel to the work table 14 and to be mounted thereon by means of pillow blocks or bearing brackets in the manner described above in connection with shaft 33, unless stated differently.

Figure 3:
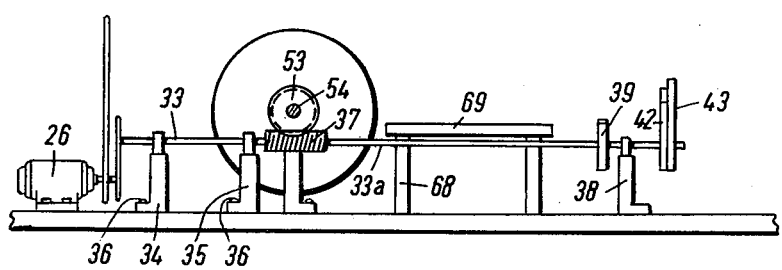
FIG. 3 shows a detail of the apparatus of FIG. 1 in side elevation on a reduced scale.

Reverting now to FIG. 1, partly with reference to FIG. 3, the counter shaft 33 is seen to have coaxial extension shaft 33a which carries a worm 37 and a spur gear 39 in meshing engagement with a gear 40 on a shaft 41. The driven member 42 of a Geneva movement is fixedly mounted on the shaft 41 and carries an eccentric axial pin 104. The driving member 43 of the Geneva movement is a wheel having four axial slots 103 engaged by the pin 104. The Geneva wheel 43 is secured on a shaft 44 and actuates the intermittent rotary movement of a feed roll 45 mounted on the shaft 44. The roll 45 cooperates with an idler feed roll 46 mounted on the sewing machine arm 12 by means of brackets 47 in which the roll 46 is journaled on a pin 48. A plastic filament 49 of narrow flat shape is drawn by the feed rolls 45, 46 from a reel 50 rotatably mounted on a shaft 51.

The worm 37 on the extension shaft 33a meshes with a worm wheel 53 and thereby actuates rotation of a split shaft 54 and of a reel 55 on which the product of the apparatus of FIG. 1 is received as will become apparent hereinafter. Cords 57a and 57b are drawn by the reel 55 from respective bobbins 58a and 58b rotatably mounted on a common shaft 59.

Figure 2:
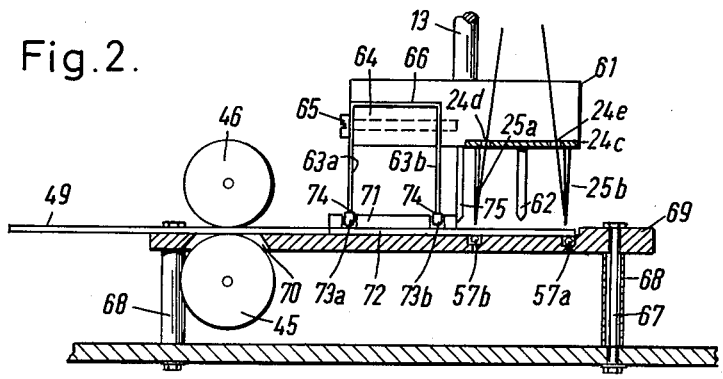
FIG. 2 shows the apparatus of FIG. 1 in fragmentary front elevational section on the line II—II.

As better seen from FIG. 2, the needle bar 13 carries a cross member 61 on which the two needles 25a, 25b and the thread guide 24c are mounted. The latter has two openings 24d and 24e for passage of the two threads 17a and 17b. The underside of the cross member 61 carries a punch 62 which is offset from the needles 25 in the direction of elongation of the arm 12 and extends substantially in the median plane between the two needles. Its working end is displaced slightly upward from the needle tips.

Two rams 63a and 63b aligned in a common vertical plane with the needles 25 are spaced from each other by a spacer block 64. Their distance is equal to the distance between the needles 25. The rams 63 are assembled with the block 64 by a bolt 65 which secures the rams together with the block in a recess 66 of the cross member 61.

The bed plate 69 of the sewing machine which carries the mechanism for the underthreads (not shown) is spacedly secured on the work table 14 by four bolts 67 cooperating with four sleeves 68. The path of the plastic filament extends from the reel 50 in a straight line along the top of the bed plate 69 to the work station of the sewing machine under the needles 25. The bed plate 69 is formed with an opening 70 along this path through which the feed roll 45 extends upwardly into feeding engagement with the filament 49 which is held under pressure between the two rolls 45, 46.

A guide block 71 is mounted on the bed plate 69 under the rams 63. A groove on the underside of the block 71 forms a guide channel 72 for the filament 49. Two vertical bores 73a and 73b in the block 71 communicate with the channel 72 and guide two dies 74 respectively mounted on the rams 63 into embossing contact with the filament 49. A cutting blade 75 extends downwardly from the cross member 61 and slides along a face of the block 71 during reciprocating movement of the needle bar 13 to sever the forward portion of the plastic filament 49 which is located at the working station of the sewing machine from the continuous length being drawn from the reel 50.

The bed plate 69 has an elongated recess 76 the width of which corresponds to the length of the forward filament portion 78 cut off by the blade 75 during each operating cycle of the apparatus. Two longitudinally extending guide grooves 77a and 77b in the recess 69 are transversely aligned with the paths of movement of the needles 25a and 25b respectively for guiding the cords 57a and 57b under the needles for sequential assembly with the consecutive severed forward portions 78 of the plastic filament 49. The shoulders formed in the recess 69 by the grooves 77 guide and support the ends of the severed filament portions as they move with the cords out of the sewing station transversely of the original filament path. A roller 79 prevents upward movement of the assembled stringer of shaped filament portions 78 which constitute preformed fastener elements and of the two cords 57 in the work station. The roller 79 is mounted on the sewing machine arm 12 by a pin 80 journaled in two arms 81.

The afore-described apparatus operates as follows:

The plastic filament 49 is drawn from the reel 50 by the rolls 45, 46. The rolls which rotate only during a fraction of each machine cycle feed the filament stepwise toward the work station of the sewing machine. Each feed movement advances the filament by a distance about equal to the width of the recess 76 in the bed plate 69. The filament is pushed by the rolls 45, 46 into the guide block 71. The movements of the needle bar 13 and of the feed rolls 45, 46 are synchronized in such a manner that the filament is moved along its path when the needle bar 13 with the devices attached thereto is moving upward away from the bed plate 69 and while these devices are still spaced from the filament path during the downward stroke of the needle bar 13.

The filament thus is stationary when it is hit by the dies 74 on the rams 63. The dies form notches on the top face of the filament which are spaced from each other as far as the spacing of the needles 25a and 25b. During the next machine cycle the notched filament section is pushed out of the channel 72 and is positioned in the recess 76 as is seen in FIG. 2. On the downward stroke of the needle bar 13, the cutting blade 75 severs the notched forward portion of the filament from the continuous length thereof.

The cords 57 are drawn from their respective bobbins 58 by the tension exerted by the slowly rotating reel 55 on the finished stringer wound on the reel 55. The reel is driven continuously by the worm 53 but it is mounted on the split shaft 54 by friction only so that it will slip on the shaft 54 when the tension in the stringer exceeds a predetermined value.

When upon the downward stroke of the needle bar 13 the needles 25 pass through the cords 57 they temporarily stop movement of the cords towards the reel 55, and may stop movement of the reel itself. As best seen from FIG. 1, the needles 25 are slightly offset from the path of the plastic filament so that they will not hit the filament but will loop a stitch over the top of the filament in the previously formed notches and anchor it to the cords. Upon upward movement of the needle bar 13, the needles 25 release the cords 57 and permit their continued movement toward the reel 55.

Upon the next downward stroke of the needle bar 13, the last sewn preformed fastener element 78 is aligned with the punch 62 which flattens the center portion of the element and forms a head which will interlock with the head of an adjoining element in a well known manner when the slide fastener is completely assembled.

If desired, the needle bar 13 may perform a plurality of reciprocating movements between successive feed movements to form a plurality of stitches between adjacent elements 78.

Two examples of preformed elements capable of being shaped and attached to cords by the apparatus of FIG. 1 are illustrated in FIGS. 4 and 5. FIG. 4 shows a preformed element made from a filament of oval cross section. It has two notches 105a and 105b formed in its top by the dies 74, and its center portion 106 has been flattened by the punch 62. The element shown in FIG. 5 was formed by differently shaped dies and punches. It has two notches 105c on each side, and its center portion 106' has been flattened in a different pattern lacking a diamond-shaped depression seen in the element of FIG. 4. The element of FIG. 5 is made of a flat filament of elongated rectangular cross section. In both elements the notches 105 are intended to receive sewing threads formed into loops or stitches by the needles 25, whereby the stitches are held in place on the elements.

Figure 8:
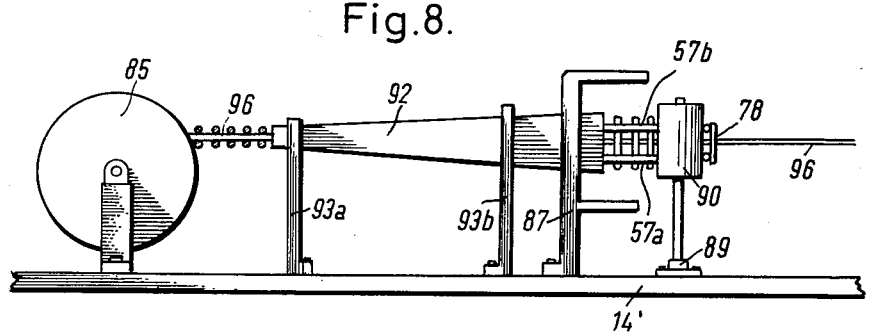
FIG. 8 shows the apparatus of FIG. 7 in fragmentary side elevation.

The ladder-like stringer produced on the apparatus of FIG. 1 may then be assembled with a carrier tape on the apparatus shown in FIGS. 7 and 8 which is also an attachment for a conventional sewing machine of which only the arm 12' and the working table 14' are illustrated whereas the stitch forming apparatus has not been shown so as better to reveal the novel features of this invention. The sewing machine is of the single-needle type and forms stitches from an upper thread 17.

The sewing machine is driven by an electric motor 26' the output shaft of which also carries a pulley 30' over which a belty 82 is trained. The belt drives a pulley 83 fixed on a shaft 84. A reel 85 is mounted on the shaft 84 and the finished fastener chain is wound on the reel in the same manner in which the stringer formed in the apparatus of FIG. 1 is wound on the reel 55. That reel 55 after being filled to the desired extent is mounted on a bracket 87 of the apparatus of FIG. 7 and the stringer consisting of the cords 57 carrying the uniformly spaced preformed fastener elements 78 is drawn off the reel 55 which is thereby rotated. The stringer is passed over a guide roller 90 rotatable on a vertical shaft 88 which is journaled in a foot step bearing 89 on the table 14'.

The stringer then enters an elongated U-shaped trough 92 the opening on which is on one side. The leg portions of the U-shaped section become longer from one end of the trough to the other in the direction of stringer movement whereas the bight portion shortens simultaneously so that the trough becomes narrower and deeper as the stringer proceeds from one end to the other. The trough 92 is fixedly mounted on the work table 14' by two supports 93a, 93b and cooperates with a guide plate 94 mounted on the table 14' by means of two brackets 95a and 95b. The edge of the guide plate 94 is approximately parallel to the bight portion of the trough 92 and is spaced therefrom in the median plane of the trough. The center portions of the preformed slide fastener members 78 are thus held by the edge of the plate 94 close to the bight portion of the trough 92 whereas the free ends of the elements are bent up toward the plate 94 by the gradually narrowing walls of the trough 92 as the elements are moved along the trough by the cords 57. They gradually assume a U-shape substantially conforming to the trough section.

The terminal portion of the trough 92 is located in the working area of the sewing machine. It has openings 107 in the top and bottom walls which correspond to the legs of the U-shaped cross section. The openings 107 of which only one is visible in FIG. 7 are aligned with the path of reciprocating movement of the needle 91 of the sewing machine.

A carrier tape 96 is drawn by the rotation of the reel 85 from a spool 97 toward the work station of the sewing machine. The spool 97 is rotatably mounted on a pin 98 which is supported in standards 99 on the work table 14'. The carrier tape 96 passes under the guide plate 94, over a guide roll 100 rotatable on a bracket 102, and enters the open side of the trough 92 near its narrow end, substantially in the median plane of symmetry of the trough.

The relative positions of an element 78, the cords 57, and the tape 96 in a transverse plane through the finished chain is shown in FIG. 6. The notches formed by the dies 74 in the apparatus of FIG. 1 now face each other. The sewing threads 17a and 17b which secure the elements 78 to the cords 57a and 57b are seen in the notches. The element 78 is bent into a U-shape about an edge of the tape 96 and is to be secured to the tape in this position by a sewing thread. The several elements of the fastener chain reach their final relative position at the opening 107 in the trough 92 and are then secured to each other by the needle 91 which sews a thread (not shown) through the two cords 57 and the tape 96 between adjacent elements 78. The finished fastener chain is then wound on the reel 85. It is taken through conventional further processing in which two chains are engaged with each other and, provided with sliders and end stops as desired.

Figure 10:
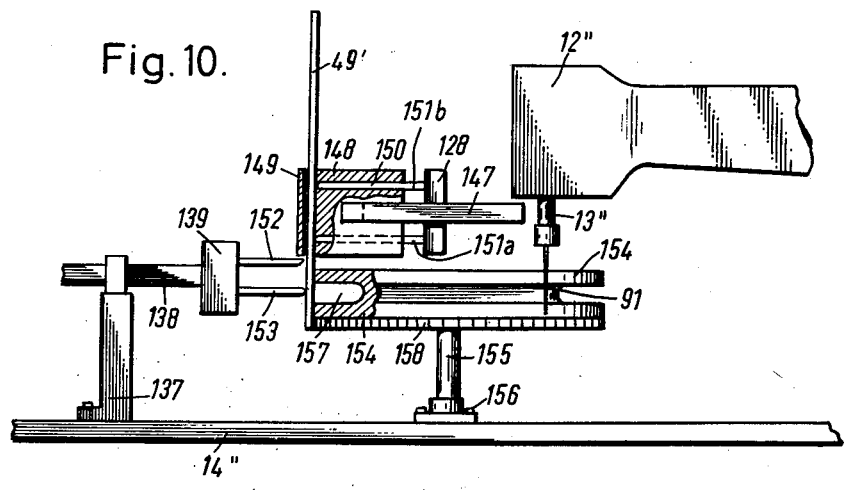
FIG. 10 is a side elevational view of the apparatus of FIG. 9 in section on the line X—X.

A modified apparatus of the invention which produces fastener chain in a single operation is shown in a perspective view in FIG. 9 and details thereof are illustrated in side elevation in FIG. 10. Referring firstly to FIG. 9, there is seen again a conventional single-needle sewing machine having an arm 12" and mounted on a work table 14" in the same manner as described hereinbefore. The loop forming elements of the machine have again been entirely omitted.

The motor 26" of the sewing machine drives a counter shaft 108 by means of a drive pulley 30", belt 82", and pulley 109. The countershaft 108 actuates rotation of the several parts of the apparatus by means of pulleys 110, 111, 112, and 113.

A belt 114 trained over the pulley 110 and a driven pulley 115 on a shaft 54' drives a reel 55' on which the finished slide fastener chain is wound. A belt 18 transmits rotation from the pulley 111 to a pulley 119 on a shaft 120 which actuates rotation of a gear wheel 122. The pulley 112 drives the pulley 124, the shaft 125 and the eccentric 126 by means of the belt 123. A connecting rod 127 pivotally secured to the eccentric 126 and linked to a rectangularly bent arm 129 which is slidable in a guide bracket 130 causes reciprocating movement of the arm 129 in a horizontal plane when the eccentric rotates. A cross bar 128 is fastened to the arm 129 and moves with it. The shaft 125 also carries the drive pulley 132 which rotates the shaft 134 and its eccentric 135 by means of a belt trained over the driven pulley 133. The eccentric actuates reciprocating movement of a cross member 139 in a horizontal direction by means of a connecting rod 136 and a slide 138 which is movably supported on a bracket 137.

The pulley 113 which is also secured on the countershaft 108 drives a pulley 140 on a shaft 141 to which the driven member 142 of a Geneva movement is fastened. An idler feed roll 143 is journaled on the shaft 141. The Geneva wheel 146 which moves intermittently during the continuous movement of the driven member 142 is mounted on a common shaft 145 with the driven feed roll 144 which cooperates with the idler roll 143. A plastic filament 49' of flat tape shape is intermittently drawn by the feed rolls 144, 145 from a reel 50'.

As better seen from the sectional view of FIG. 10, an arm 147 mounted on the sewing machine arm 12" carries a guide block 148 which has a vertical bore 149 for passage of the plastic filament 49'. Two horizontal bores 150 in the block 148 communicate with the vertical bore 149 and guide two die carrying rams 51a and 51b respectively which are spacedly mounted on the cross bar 128.

The cross member 139 carries a cutting blade 152 and a punch 153 and moves them reciprocally into and out of the path of the plastic filament 49' as it emerges from the vertical bore 149. The cutting blade 152 is guided in its movement by the bottom surface of the guide block 148.

A shaping disc 154 is mounted under the arm 147 on a vertical shaft 155 which is journaled on a foot step bearing 156. The disc 154 has an annular groove in its cylindrical face which is flush with the downward path of the filament 49' as best seen from FIG. 10. The punch 153 is axially aligned with the median plane of the groove 157 and is moved by the cross member 139 in a path which is radial with respect to the disc 154. The punch 153 and groove 157 thus cooperate as the male and female member of a forming die between which a portion of the filament 49' is shaped. The disc 154 is rotated by a coaxial gear rim 158 fastened to the underside of the disc 154 and in meshing engagement with the gear 122.

The carrier tape 96' is led from the spool 97' to the reel 55' in a path which is approximately tangential to the disc 154 at a work station 90° offset in the direction of the arrow 159 from the path of the continuous filament 49' toward the disc. The tape is held in a radial plane and its edge enters the groove 157. The needle 91' of the sewing machine reciprocates along an axial line closely adjacent the cylindrical face of the disc 154 at the work station. A wedge-shaped stripping member 154a mounted on the work table 14" extends into the groove 157. Its forward edge extends axially in the groove near the bottom thereof at the work station and faces in a direction opposite to that of the arrow 159.

The apparatus of FIGS. 9 and 10 operate as follows:

Plastic filament 49' is drawn from the spool 50' intermittently by the feed rolls 143 and 144, there being one feed movement in each working cycle. The rolls push the forward end of the filament 49' through the vertical bore 149 in the guide block 148. The die carrying rams 151 perform their working stroke while the filament stands still and form two spaced notches 105 on one side of the filament. During the next feed stroke the notched filament portion moves out of the block 148 and the next portion is brought under the rams 151. While that portion is notched by the rams, the forward portion of the filament 49' is cut off by the cutting blade 152 to a length approximately equal to the axial height of the wheel 154 and pushed by the punch 153 into the groove 157. In this process the severed forward portion of the filament is bent into a U-shape conforming approximately to the section of the grove 157 and a head 106 is formed by the punch 153 in the bight portion of the U-shape. The resilience of the legs of the resulting U-shape holds the shaped filament portion 78' in the groove in a plane which passes through the axis of the disc after the punch 153 is withdrawn, and the filament portion is moved by the rotating wheel 154 in the direction of the arrow 159 toward the work station of the sewing machine.

The tape 96' is drawn toward the working station by the reel 55' and enters the space between the legs of the U-shaped filament portion 78. When filament and tape are aligned with the next stitch to be produced by the needle 91', the legs of the filament portion 78' extend perpendicularly to the direction of movement of the tape 96' and are secured to the tape in this position by the sewing thread which is laid by the needle 91' across the notches 105 of the preformed filament portion. It will be understood that an underthread is laid in a similar manner across the notch of the lower leg of the filament portion not visible in FIG. 9. Transfer of the filament portion from the groove 157 to the tape 96' is facilitated by the stripping member 154a the leading edge of which is inserted between the bottom of the groove 157 and the bight portion of the filament portion 78' as the latter reaches the work station. Successive portions 78' are angularly spaced in the groove 157 and are accordingly spaced longitudinally on the carrier tape 96'.

The slide fastener chain wound on the reel 55' after leaving the work station of the sewing machine in substantially ready to be assembled with another equal chain, a slider, and other attachments to form a slide fastener. It is seen in a fragmentary perspective view in FIG. 11. It will be noted that the apparatus of FIGS. 7 and 8 bends the plastic elements 78 in such a manner that their notches are on the inside of the resulting U-shape, whereas in the apparatus of FIGS. 9 and 10, the notches on the elements 78' appear on the outside of the finished product as clearly seen in FIG. 11 so that the sewing thread 17 may hold the legs of the element to the tape 96'.

It should be understood of course that the foregoing disclosure relates only to preferred embodiments of the invention and that it is intended to cover all changes and modifications of the examples of the invention herein chosen for the purpose of the disclosure which do not constitute departures from the spirit and scope of the invention set forth in the appended claims.

What I claim and desire to be protected by Letters Patent of the United States is:

1. An apparatus for the manufacture of slide fastener chain from a continuous plastic filament and flexible support means, comprising a support; sewing machine means having a work station on said support; first feed means on said support for feeding a continuous length of plastic filament toward said station along a predetermined path; die means movable on said support transversely toward and away from said path for shaping said filament; cut off means on said path intermediate said die means and said station for severing consecutive forward portions of the shaped filament from said continuous length; bending means intermediate said cut off means and said station for bending said forward portions; second feed means on said support for feeding flexible support means in continuous length to said station in a direction transverse of said path for sequential sewing of said forward portions to said flexible support means by said sewing machine means at said station; and actuating means for actuating synchronized movement of said feed means, die means, cut off means, bending means, and sewing machine means.

2. An apparatus as set forth in claim 1, wherein said sewing machine means includes two spaced sewing needles jointly movable toward and away from said station, and said flexible support means includes two flexible support members fed to said station by said second feed means for sewing of respective portions of each of said forward portions to said flexible support members by a respective one of said needles.

3. An apparatus as set forth in claim 2, wherein said needles, said die means and said cut off means are aligned for movement in a common plane.

4. An apparatus as set forth in claim 1, said bending means including a male die member and a female die member, one of said die members being movable transversely of said path.

5. An apparatus as set forth in claim 1, said bending means including a wheel member rotatable about an axis and formed with an annular recess about said axis, and a punch member movable toward and away from said wheel member in a radially extending direction for bending one of said forward portions between said punch member and said wheel member in said recess, said path leading from said cut off means along a portion of said recess to said station.

6. An apparatus as set forth in claim 5 wherein said wheel member and said punch member jointly define a U-shaped portion in said recess for bending said forward portion into a U-shape, said flexible support means are supporting tape means having an edge, and said first feed means include means for positioning said bent forward portions on said edge of said tape means in spaced relationship.

7. An apparatus as set forth in claim 6, wherein said sewing machine means includes stripper means at said station for transferring said bent forward portions from said wheel member to said tape means.

References Cited in the file of this patent

UNITED STATES PATENTS

| | | |
|---|---|---|
| 2,256,796 | Soave | Sept. 23, 1941 |
| 2,822,770 | Schwartz | Feb. 11, 1958 |

FOREIGN PATENTS

| | | |
|---|---|---|
| 1,050,266 | France | Sept. 2, 1953 |